United States Patent
Fujii

(10) Patent No.: US 10,539,226 B2
(45) Date of Patent: Jan. 21, 2020

(54) INPUT DEVICE FOR TRANSMISSION

(71) Applicant: Panasonic Intellectual Property Management Co., Ltd., Osaka (JP)

(72) Inventor: Kenji Fujii, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 393 days.

(21) Appl. No.: 15/627,495

(22) Filed: Jun. 20, 2017

(65) Prior Publication Data

US 2018/0087657 A1    Mar. 29, 2018

(30) Foreign Application Priority Data

Sep. 26, 2016   (JP) .................. 2016-187144

(51) Int. Cl.
*F16H 59/02* (2006.01)
*F16H 59/04* (2006.01)
*F16H 59/12* (2006.01)
*F16H 59/08* (2006.01)

(52) U.S. Cl.
CPC ....... *F16H 59/0204* (2013.01); *F16H 59/044* (2013.01); *F16H 59/12* (2013.01); *F16H 2059/081* (2013.01)

(58) Field of Classification Search
CPC ......... F16H 59/0204; F16H 2059/0239; F16H 2059/081; F16H 2059/082
See application file for complete search history.

(56) References Cited

U.S. PATENT DOCUMENTS

| | | | |
|---|---|---|---|
| 6,192,770 B1* | 2/2001 | Miyoshi | F16H 59/0204 74/473.18 |
| 2009/0000413 A1* | 1/2009 | Furhoff | B60K 37/06 74/473.3 |
| 2013/0047768 A1* | 2/2013 | Kamoshida | F16H 59/08 74/473.3 |
| 2015/0267807 A1* | 9/2015 | Tokumo | F16H 59/08 701/52 |
| 2016/0245402 A1* | 8/2016 | Fribus | B60R 25/252 |

FOREIGN PATENT DOCUMENTS

JP    2010-137623    6/2010

* cited by examiner

*Primary Examiner* — Edwin A Young
(74) *Attorney, Agent, or Firm* — Seed IP Law Group LLP

(57) ABSTRACT

An input device for a transmission includes, a knob with which an operator performs rotation and press operations, a rotation detector for detecting that the knob is rotated, a press detector for detecting that the knob is pressed, and a controller for performing, based on results of detection by the rotation detector and the press detector, a range shift between a first forward travel range where a gear shift operation performed by the operator is not accepted and a second forward travel range where the gear shift operation is accepted, and for performing a gear shift in the second forward travel range.

6 Claims, 17 Drawing Sheets

INPUT DEVICE FOR TRANSMISSION

BACKGROUND

1. Technical Field

The present disclosure relates to an input device for a transmission for performing, for example, range and shift input operations to the transmission.

2. Description of the Related Art

As a conventional input device for a transmission, for example, PTL 1 discloses a shift operation device for a vehicle that includes a dial knob for performing a range shift in a normal shift mode, and a shift lever device for switching to a sport shift mode. In this sport shift mode, a shift lever is used to perform a gear shift such as an up shift, a down shift, and other actions.

CITATION LIST

Patent Literature

PTL 1: Unexamined Japanese Patent Publication No. 2010-137623

SUMMARY

In the above described shift operation device for a vehicle disclosed in PTL 1, the dial knob is used to perform a range shift operation in the normal shift mode, while the shift lever device is used to perform a gear shift operation in the sport shift mode. As described above, in order to perform a range shift operation and a gear shift operation, a user has to move his or her hand between the dial knob and the shift lever device, and such a configuration results in less operability. In addition to the dial knob, attaching the separate shift lever device to a vehicle results in an increased cost.

In view of the above described problems in the conventional art, the present disclosure has an object to provide an input device for a transmission with superior operability and with cost reduction.

An input device for a transmission, according to an aspect of the present disclosure includes a knob, a rotation detector, a press detector, and a controller. The knob is rotated and pressed by an operator. The rotation detector detects that the knob is rotated. The press detector detects that the knob is pressed. Based on results of detection by the rotation detector and the press detector, the controller performs a range shift between a first forward travel range where a gear shift operation performed by the operator is not accepted, and a second forward travel range where the gear shift operation is accepted, and performs a gear shift in the second forward travel range. The controller is configured to, in the first forward travel range, when a predetermined operation is performed with the knob, perform a range shift to the second forward travel range, and, in the second forward travel range, while the knob is pressed, when the knob is rotated, perform a gear shift based on the rotation of the knob.

According to this configuration, by pressing and rotating the knob in a combined manner, a range shift and a gear shift can be performed. Since neither a special gear shift device is therefore required, separate from the knob for performing a range shift, nor, accordingly, a user is required to move his or her hand between such a special shift device and the knob, an increase in cost can be suppressed, but superior operability can be achieved.

In the input device for the transmission, the controller may be configured to perform a range shift to the second forward travel range, when a condition where at least the knob is pressed in the first forward travel range is satisfied. According to this configuration, by pressing the knob, a range shift to the second forward travel range can be performed, and a gear shift can be performed in the second forward travel range, separate from other operations where the knob is not pressed.

In the input device for the transmission, in addition to the first forward travel range and the second forward travel range, at least a backward travel range and a neutral range are included. The controller may be configured to, in the second forward travel range, while the knob is pressed, limit a rotation operation to another one of the ranges. According to this configuration, an operator is able to easily recognize a range where a press operation is available.

In the input device for the transmission, the controller may be configured to, in the second forward travel range, when the knob is rotated with the knob being pressed, perform a gear shift based on a number of repeated rotation operations of the knob from a standard position to a predetermined rotation angle or a period of time during which the knob is kept maintained at the predetermined rotation angle. According to this configuration, an operator can intuitively perform a gear shift operation.

In the input device for the transmission, in addition to the first forward travel range and the second forward travel range, at least a backward travel range and a neutral range are included. The controller may be configured to, in the second forward travel range, while the knob is pressed, limit a rotation operation to another one of the ranges. According to this configuration, by limiting a rotation operation to another range while a gear shift is performed in the second forward travel range, switching to another range against an intention of an operator can be prevented.

The input device for the transmission further includes a rotation controller for controlling a rotation area of the knob. The controller may be configured to control the rotation controller as described below. In another range than the second forward travel range, when the knob is rotated with the knob not being pressed, a range shift is performed based on the rotation of the knob. Or, in the second forward travel range, when the knob is rotated with the knob being pressed, a rotation area of the knob is reduced narrower than a rotation area of the knob in the second forward travel range while the knob is not pressed.

According to this configuration, a rotation area of the knob while the knob is pressed is set narrower than a rotation area of the knob while the knob is not pressed. Since a gear shift operation while the knob is pressed and a range shift operation while the knob is not pressed are therefore separated, an erroneous operation can be prevented.

The present disclosure has been configured as described above, and is capable of providing an input device for a transmission with superior operability and with cost reduction.

The above described object, other purposes, features, and advantages of the present disclosure will be apparent from detailed advantageous aspects and exemplary embodiments described below with reference to drawings.

DETAILED DESCRIPTION

Exemplary embodiments of the present disclosure will now specifically be described herein with reference to the drawings. Identical or equivalent components are applied with identical numbers or symbols through all the drawings, and duplicated descriptions of the components are omitted. For convenience of description, a direction toward a knob with respect to a case is referred to as upward or upper, while an opposite direction is referred to as downward or lower. An input device for a transmission may however be attached in a desired direction, and, according to this attaching direction, the knob does not always lie on the case.

First Exemplary Embodiment

Figure 1:
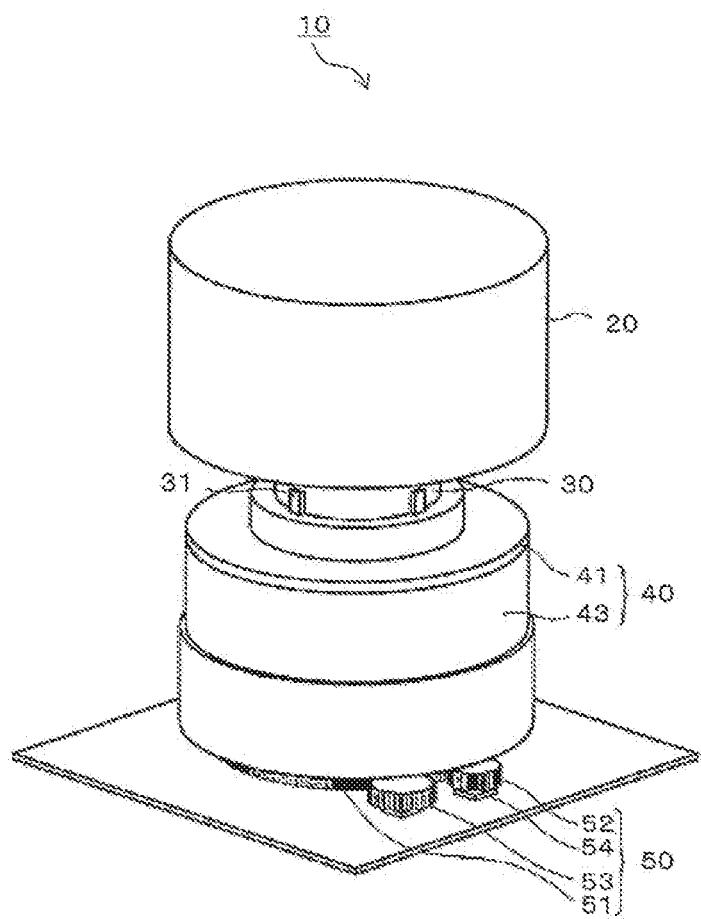
FIG. 1 is a perspective view schematically illustrating an input device for a transmission, according to a first exemplary embodiment of the present disclosure.

Input device 10 for a transmission, according to an exemplary embodiment will now first be described herein with reference to FIG. 1. Input device 10 is a selector for entering, through an operation performed by an operator, range and gear levels into a transmission (not shown) of a vehicle. Input device 10 is provided on a front console, a center console, or another location of the vehicle, and includes knob 20, rotating shaft 30, rotation controller 40, and rotation detector 50. Knob 20 is coupled on column-shaped rotating shaft 30, rotating shaft 30 passes through inside cylindrical-shaped rotation controller 40, and rotation detector 50 is disposed below rotation controller 40.

Figure 2:
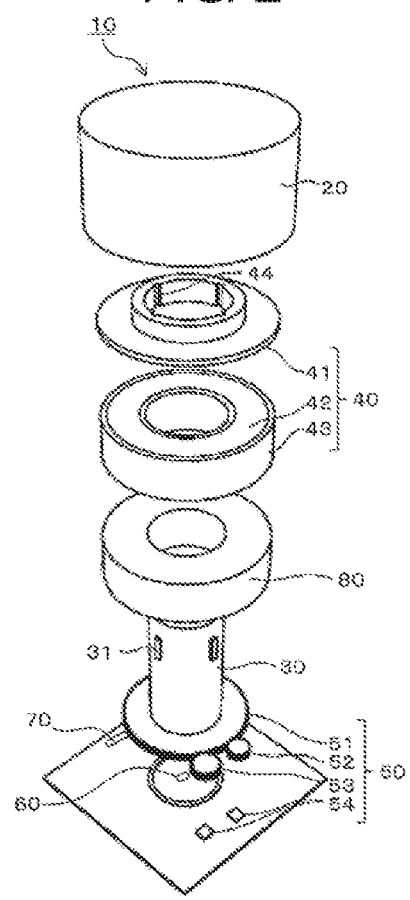
FIG. 2 is an exploded perspective view schematically illustrating the input device shown in FIG. 1.

Next, a configuration of input device 10 will now be described herein in detail with reference to FIG. 2. In addition to knob 20, rotating shaft 30, rotation controller 40, and rotation detector 50, input device 10 includes press detector 60, press prohibitor 70, and tactile-feel providing portion 80. Knob 20 is rotated and pressed by an operator, and has a column shape such as a circular column shape and a rectangular column shape.

Rotating shaft 30 is a bar member extending in a vertical direction, is coupled on its upper end with knob 20, and rotates and vertically moves together with knob 20. On an outer peripheral surface of rotating shaft 30, a plurality of projections 31 (four in this exemplary embodiment) is provided. Projections 31 are separated each other at even intervals in a circumferential direction of rotating shaft 30, and radially project with respect to a central axis of rotating shaft 30.

Rotation controller 40 permits and prohibits knob 20 and rotating shaft 30 from rotating, uses an electromagnetic brake, for example, and includes armature 41, electromagnet 42, and yoke 43. Armature 41 is made of a magnetic material such as iron, and includes an annular portion provided with an opening at its center, and a cylindrical-shaped inner cylinder portion rising upward from an edge of the opening of the annular portion. On an inner peripheral surface of the inner cylinder portion, a plurality of grooves 44 (four in this exemplary embodiment) extending in a vertical direction is provided. On grooves 44, projections 31 of rotating shaft 30 fit to couple rotating shaft 30 and armature 41.

Electromagnet 42 is formed of a wire coil, and generates a magnetic force with electric power supplied externally. Electromagnet 42 has a cylindrical shape such as a circular cylindrical shape and a rectangular cylindrical shape, and, into an opening provided at its center, rotating shaft 30 passes through. Electromagnet 42 is provided below armature 41, and its upper surface faces a lower surface of armature 41.

Yoke 43 is made of a magnetic material such as iron, is a member for reinforcing the magnetic force of electromagnet 42, has a cylindrical shape such as a circular cylindrical shape and a rectangular cylindrical shape, and is provided with an annular groove for accommodating electromagnet 42. Yoke 43 covers an inner peripheral surface, an outer peripheral surface, and a lower surface of electromagnet 42 accommodated in the annular groove. Electromagnet 42 is exposed from an upper surface of yoke 43.

Electromagnet 42 and yoke 43 as described above are fixed to a case or another container, where, when no electric power is supplied to electromagnet 42, rotating shaft 30 can rotate with respect to electromagnet 42 and yoke 43. On the other hand, when electric power is supplied to electromagnet 42, electromagnet 42 attracts armature 41 by its magnetic force to prohibit rotating shaft 30 coupled to armature 41 from rotating.

Rotation detector 50 is a device for detecting a rotation angle of rotating shaft 30, and includes main gear 51, first gear 52, second gear 53, and detecting element 54. Main gear 51 has, for example, a disk shape provided with a plurality of teeth on its outer peripheral surface, and its diameter is greater than a diameter of rotating shaft 30. On an upper surface of main gear 51, a lower end of rotating shaft 30 is coupled so that a center of main gear 51 and a central axis of rotating shaft 30 align. As rotating shaft 30 rotates, main gear 51 accordingly rotates.

First gear 52 and second gear 53 respectively have a disk shape provided with a plurality of teeth on its outer peripheral surface, where respective diameters differ each other. First gear 52 and second gear 53 are provided laterally to main gear 51 so that the teeth of first gear 52 and second gear 53 engage the teeth of main gear 51. First gear 52 and second gear 53 therefore rotate as main gear 51 rotates. First gear 52 and second gear 53 are each attached with a magnet. As first gear 52 and second gear 53 rotate, the magnets rotate about axes of first gear 52 and second gear 53.

Detecting element 54 includes a magneto resistive element for detecting a magnetic field of the magnet of first gear 52, a first detecting element for detecting that first gear 52 is rotated, another magneto resistive element for detecting a magnetic field of the magnet of second gear 53, and a second detecting element for detecting that second gear 53 is rotated. Based on rotations of first gear 52 and second gear 53, which are detected by detecting element 54, an absolute rotation angle of main gear 51 coupled with rotating shaft 30 and knob 20 can be obtained. When an absolute rotation angle of knob 20 is not required, only either of first gear 52 and second gear 53 may be provided, instead of both of first gear 52 and second gear 53. Rotation detector 50 is not limited to this configuration. Any known technology such as rotary encoder may be used.

Press detector 60 is a sensor for detecting that knob 20 is pressed. Its configuration is not limited, but any known technology may be used. For example, press detector 60 may be a non-contact sensor such as an infrared sensor for detecting a position in a vertical direction of knob 20, or a position in a vertical direction of rotating shaft 30 or main gear 51 respectively coupled to knob 20. Press detector 60 may otherwise be a contact sensor such as a switch disposed below main gear 51, which is pressed by main gear 51 that is moved downward when knob 20 is pressed.

Press prohibitor 70 is a device for prohibiting knob 20 from being pressed. For example, a stick pin to which an actuator is coupled is used. Press prohibitor 70 is provided below main gear 51, so as to, when the actuator inserts the stick pin under main gear 51, prohibit main gear 51 from moving downward. Press prohibitor 70 prohibits knob 20 from being pressed such that knob 20 coupled, via rotating shaft 30, to main gear 51 does not move downward. On the other hand, when the actuator withdraws the stick pin from under main gear 51 to permit main gear 51 to move downward, press prohibitor 70 cancels the prohibition of a press operation to knob 20.

Tactile-feel providing portion 80 is a device for generating, when knob 20 is rotated, a tactile feel per predetermined rotation angle, where, for example, a tactile feel is generated by providing a sense of force or another effort to an operator when knob 20 is at a predetermined rotation position. For example, tactile-feel providing portion 80 has a cylindrical shape such as a circular cylindrical shape and a rectangular cylindrical shape, where, into an opening provided on its center, rotating shaft 30 passes through, and rotating shaft 30 rotates with respect to tactile-feel providing portion 80. Each time rotating shaft 30 rotates at a predetermined angle, tactile-feel providing portion 80 provides a force or another effort to rotating shaft 30, so that an operator is able to feel the force or the effort via rotating shaft 30.

Figure 3:
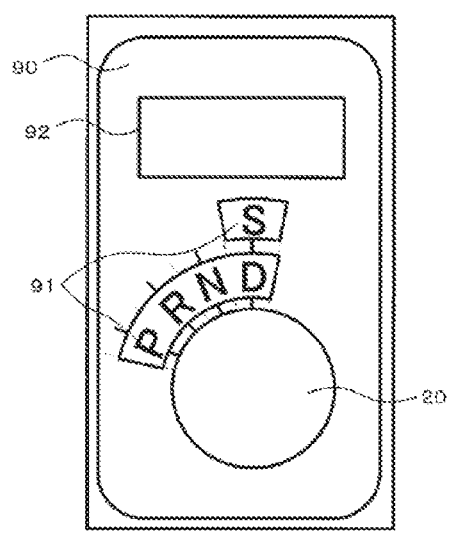
FIG. 3 is a view of the input device shown in FIG. 1, when viewed from above.

Next, indications of input device 10 will now be described herein with reference to FIG. 3. Input device 10 is provided in case 90, where knob 20 projects from a surface of case 90, while other components are accommodated in case 90. On the surface of case 90, labels 91 indicating ranges, and display 92 for indicating levels of a range and a gear set currently are provided.

Labels 91 are provided around knob 20, and indicate, for example, P, R, N, D, and S on case 90. On the labels, P, R, N, and D are disposed at even intervals in a circumferential direction of knob 20, while S is disposed next to D in a diameter direction of knob 20. When an operator rotates and presses knob 20, knob 20 rotates and vertically moves with respect to case 90 to set one of ranges P, R, N, D, and S.

P is a parking range, in other words, a non-travel range, at which a drive shaft of the transmission is locked. Range N is a neutral range, in other words, another non-travel range, at which, in the transmission, no power transmits to wheels. Range R is a reverse range, in other words, a backward travel range, at which the vehicle moves backward. Range D is a drive range at which the vehicle moves forward, in other words, a first forward travel range where an operation of an operator is not accepted, and, in still other words, an automatic mode at which a gear level is automatically switched in accordance with a vehicle speed and a rotation speed of an engine. Range S is a sport range at which the vehicle moves forward, in other words, the second forward travel range at which an operation of an operator is accepted, and, in still other words, a manual mode at which a gear level is manually switched through an operation of the operator.

Display 92 is, for example, a digital display, and indicates currently set levels of a range and a gear with characters and/or numerals. Although display 92 is disposed on case 90 provided with knob 20, this arrangement is merely an example. For example, display 92 may be disposed on a meter panel (not shown) provided with a speedometer, an odometer, and other meters.

Figure 4:
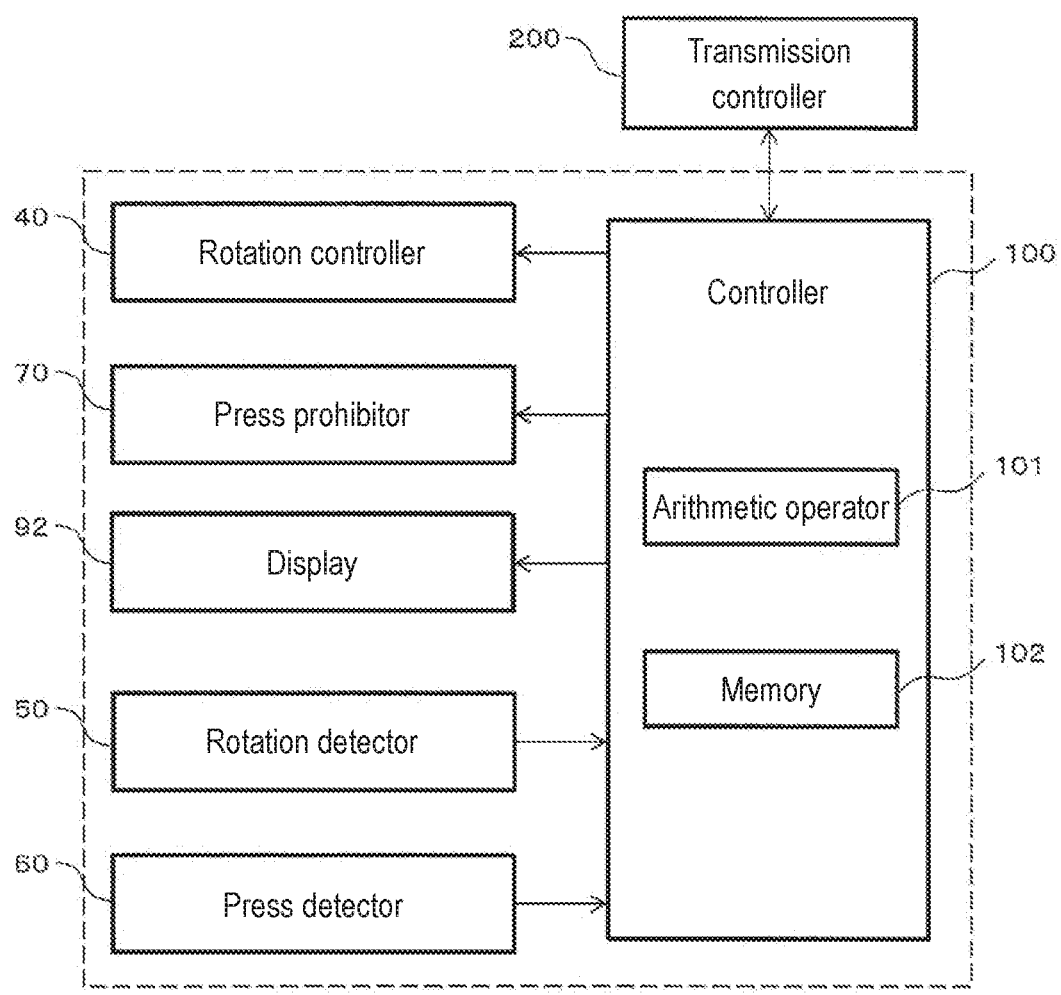
FIG. 4 is a functional block diagram illustrating a configuration of the input device shown in FIG. 1.

Next, controller 100 provided in input device 10 will now be described herein with reference to FIG. 4. Controller 100 is a device for performing a range shift, based on results of detection by rotation detector 50 and press detector 60, and for performing a gear shift in the second forward travel range. Controller 100 includes arithmetic operator 101 such as a CPU, and memory 102 such as a ROM and a RAM, and is electrically coupled to rotation controller 40, press prohibitor 70, display 92, rotation detector 50, press detector 60, and controller 200 of the transmission. Controller 100 may be formed of a single control device for centralized control, or a plurality of control devices that cooperates each other for dispersed control.

Memory 102 stores a basic program for controlling a range shift and a gear shift, and information including various fixed data. Arithmetic operator 101 reads and executes software such as the basic program stored in memory 102 to control various operations. For example, controller 100 performs, when knob 20 is pressed or rotated, a range shift from the first forward travel range to the second forward travel range, and switches, when knob 20 is rotated with knob 20 being pressed, a gear ratio based on the rotation of knob 20 to perform a gear shift in the second forward travel range.

Figure 5A:
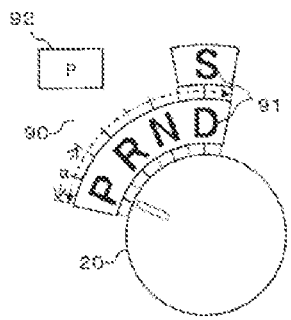
FIGS. 5A to 5F are views for describing an operation method of the input device shown in FIG. 1.

Next, an operation method of input device 10 will now be described herein with reference to FIGS. 5A to 6. The operation method of input device 10 is controlled by controller 100. In FIGS. 5A to 5F, a bar mark indicating a set position of a current range is shown by a dotted line on an upper surface of knob 20 for convenience of description. However, such a mark may not be provided on knob 20.

In this exemplary embodiment, when knob 20 is rotated with knob 20 not being pressed, a range shift is performed in an area from range P to range D, other than range S. When knob 20 is pressed, a range shift is performed from range D to range S. When pressed knob 20 is released, a range shift is performed from range S to range D. When knob 20 is rotated with knob 20 being pressed, a gear shift is performed in range S. As described above, when knob 20 is pressed, a range shift is performed between range D and range S (range shift through pressing), while, when knob 20 is rotated, a range shift is performed in the area from range P to range D (range shift through rotating), and a gear shift is performed in range S.

When knob 20 is used for a range shift through rotating, a rotation area of knob 20 indicated by arrows with a dash-dotted line shown in FIG. 5A (range shift area) is divided into range areas per predetermined angle ($\alpha$ degrees). Here, a clockwise direction (right direction) is referred to as a + direction, while a counterclockwise direction (left direction) is referred to as a − direction, and a position of knob 20 when the engine is started is referred to as an initial value (0 degrees). From this initial value, an area from $-\alpha/2$ degrees to $+\alpha/2$ degrees is an area of range P, an area from $+\alpha/2$ degrees to $+3\alpha/2$ degrees is an area of range R, an area from $+3\alpha/2$ degrees to $+5\alpha/2$ degrees is an area of range N, and an area from $+5\alpha/2$ degrees to $+7\alpha/2$ degrees is an area of range D and range S. When knob 20 is rotated into one of the areas, a range shift is performed in the area from range P to range D.

Figure 5B:
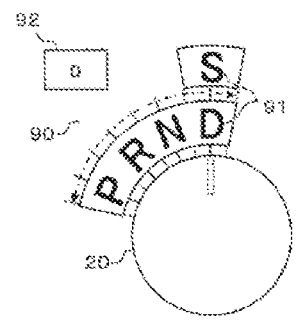
Figure 5C:
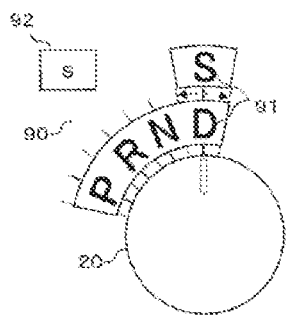

When knob 20 is used for performing a gear shift in range S, a rotation area of knob 20 indicated by arrows with a dash-dotted line shown in FIG. 5C (gear shift area) is an area of range S (for example, an angle area from $+5\alpha/2$ degrees to $+7\alpha/2$ degrees), and a standard position in this case is a center of the gear shift area ($+6\alpha/2$ degrees in this exemplary embodiment). When knob 20 is rotated in this gear shift area, a gear shift is performed.

Specifically, as shown in FIG. 5A, when an operator first presses a foot brake (not shown) of the vehicle and starts the engine (step S1: YES), controller 100 sets range P, and outputs a signal of this range to controller 200 of the transmission (step S2). Accordingly, the transmission is set to a state corresponding to range P.

Controller 100 indicates a character of P on display 92. The operator can therefore recognize that a currently set range is range P.

Controller 100 further controls rotation controller 40 to set, as indicated by arrows shown in FIG. 5A, a rotation area of knob 20 to an area from range P to range D (range shift area). By rotating knob 20, the operator can therefore perform a range shift from range P to one of range R, range N, and range D. At this time, controller 100 controls press prohibitor 70 to prohibit knob 20 from being pressed (step S2).

Controller 100 then determines whether knob 20 is rotated, and a range shift to range D is performed (step S3). If a range shift to range D is not performed (step S3: NO), controller 100 sets a range entered through an operation of the operator, indicates the set range on display 92, and continues determination of whether a range shift to range D is performed (step S3).

On the other hand, as shown in FIG. 5B, when a range shift to range D is performed (step S3: YES), controller 100 sets range D, and indicates a character of D on display 92 (step S4). Controller 100 further controls press prohibitor 70 to cancel the prohibition of a press operation to knob 20 (step S4). The operator can therefore press knob 20, and controller 100 determines whether knob 20 is pressed (step S5). Here, while knob 20 is not pressed (step S5: NO), but range D is kept maintained (step S6: YES), determination of whether knob 20 is pressed continues (step S5). On the other hand, while knob 20 is not pressed (step S5: NO), and when a range shift from range D to another range is performed (step S6: NO), controller 100 prohibits a press operation (step S7) and processing returns to step S3.

Whereas, as shown in FIG. 5C, when knob 20 is pressed (step S5: YES), range S is set, and a character of S is indicated on display 92 (step S8). The operator can therefore perform a gear shift with a rotation operation, and knob 20 can be used for a gear shift, which was previously used for a range shift through rotating. At this time, controller 100 controls rotation controller 40 to change a rotation area of knob 20 from a rotation range shift area from range P to range D, as indicated by arrows shown in FIG. 5B, to a gear shift area for range S, as indicated by arrows shown in FIG. 5C.

As described above, while knob 20 is pressed, knob 20 can rotate from a standard position of the gear shift area to only an angle area of $\pm\alpha/2$ degrees, in other words, an angle area from $+5\alpha/2$ degrees to $+7\alpha/2$ degrees (gear shift area). At this time, tactile-feel providing portion 80 provides a predetermined force to knob 20 so that knob 20 returns to the standard position when a rotation operation to a right or left direction is performed.

After range S is set (step S8), when knob 20 is not rotated (step S9: NO), controller 100 continues determination of whether knob 20 is pressed (step S10). When knob 20 is kept pressed (step S10: YES), determination of whether knob 20 is rotated continues (step S9).

Figure 5D:
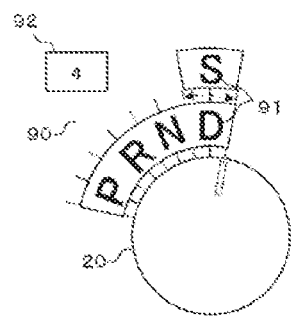

Whereas, as shown in FIG. 5D, when the operator keeps pressing knob 20, and rotates knob 20 from the standard position to a predetermined angle in a right direction (in this exemplary embodiment, to a position of $+7\alpha/2$ degrees) (step S9: YES, step S11: YES), controller 100 shifts up a gear level, for example, from a third gear to a fourth gear (step S12).

Figure 5E:
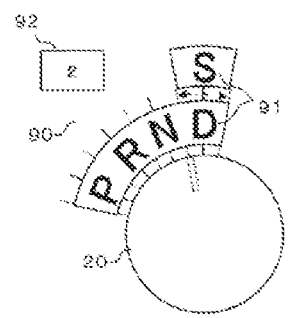

On the other hand, as shown in FIG. 5E, when the operator keeps pressing knob 20, and rotates knob 20 from the standard position to a predetermined angle in a left direction (in this exemplary embodiment, to a position of $+5\alpha/2$ degrees) (step S9: YES, step S11: NO), controller 100 shifts down a gear level, for example, from the third gear to a second gear (step S13).

After knob 20 is rotated to a predetermined angle, controller 100 determines whether knob 20 is returned to the standard position of the gear shift area (step S14). If knob 20 has not been returned to the standard position (step S14: NO), and knob 20 is kept pressed (step S15: YES), determination of whether knob 20 is returned to the standard position of the gear shift area continues (step S14).

Whereas, when knob 20 has been returned to the standard position (step S14: YES), and knob 20 is kept pressed (step S10: YES), controller 100 repeats processing of steps S9 to S15. In accordance with a number of repeated rotation operations of knob 20 from the standard position to a predetermined angle (a number of rotations) and a direction, a gear level is therefore switched, and an up shift or a down shift is performed (steps S11, S12, S13).

Figure 5F:
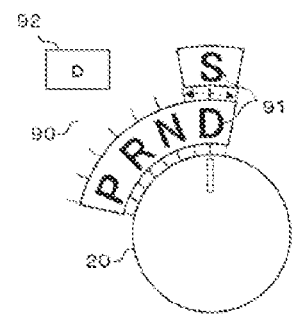

On the other hand, as shown in FIG. 5F, when pressed knob 20 is released (step S10: NO, S15: NO), controller 100 sets range D (step S16) and processing returns to step S5.

According to this exemplary embodiment, by rotating knob 20 without pressing knob 20, a range shift to one of range P, range R, range N, and range D can be performed. By pressing knob 20 in range D, a range shift to range S can be performed. Further, by rotating knob 20 with knob 20 being pressed, a gear shift can be performed in accordance with an operation of an operator. As described above, by pressing and rotating knob 20, an operator can perform a range shift and a gear shift. Since neither a special device for performing a range shift to range S nor a special device for performing a gear shift are therefore required, separate from knob 20, and accordingly a user is not required to move his or her hand between knob 20 and special devices, an increase in cost can be suppressed, but superior operability can be achieved.

Since a gear shift can be performed in accordance with a number of rotations of knob 20, an operator can intuitively perform an operation, as well as easily recognize a gear level in accordance with the operation.

In other than range D and range S, a press operation is prohibited, while, in range D or range S, the prohibition of a press operation is canceled. An operator can therefore recognize a range where a press operation is available.

Exemplary Modification of First Exemplary Embodiment

Figure 6:
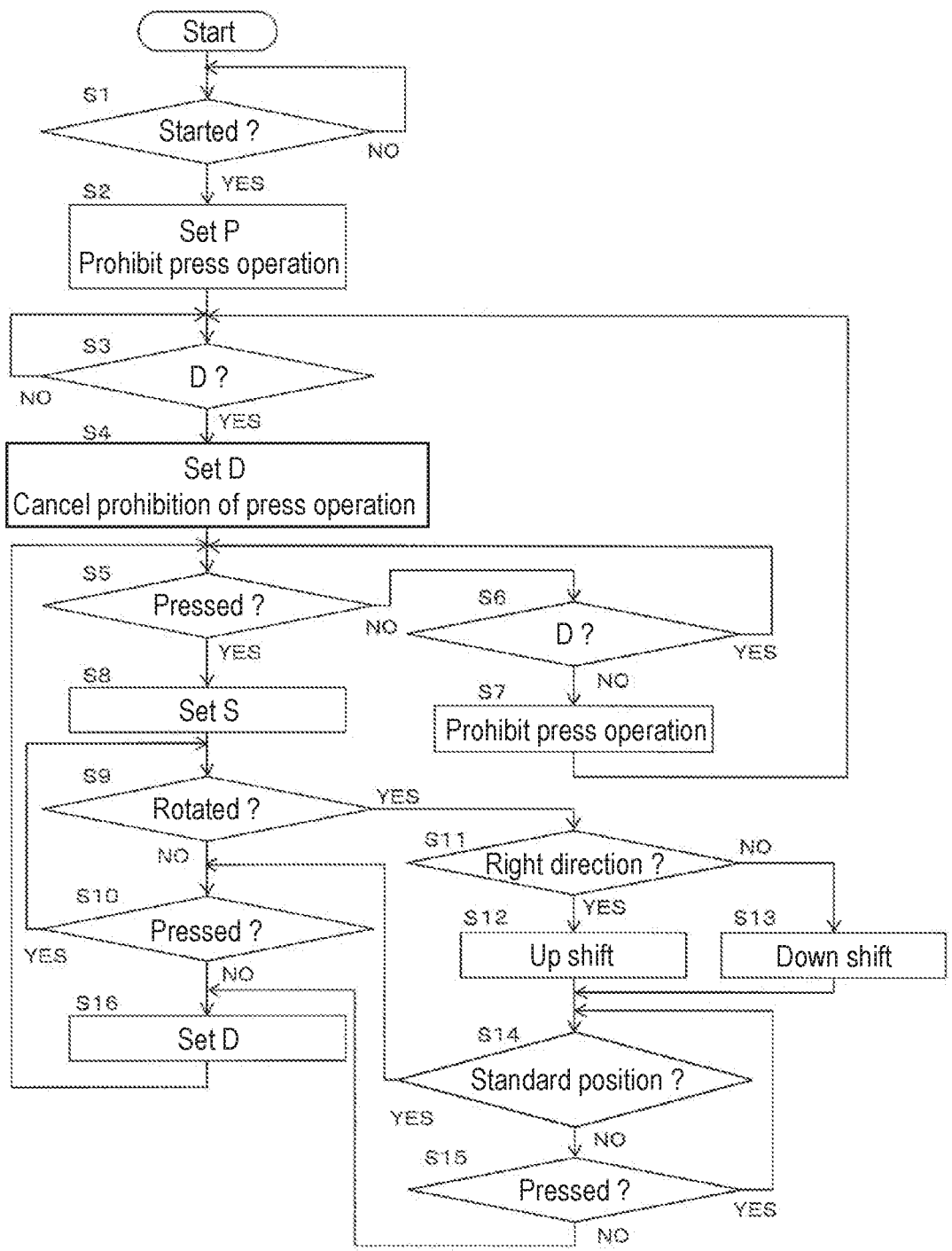
FIG. 6 is a flowchart illustrating an example of the operation method of the input device shown in FIG. 1.
Figure 7:
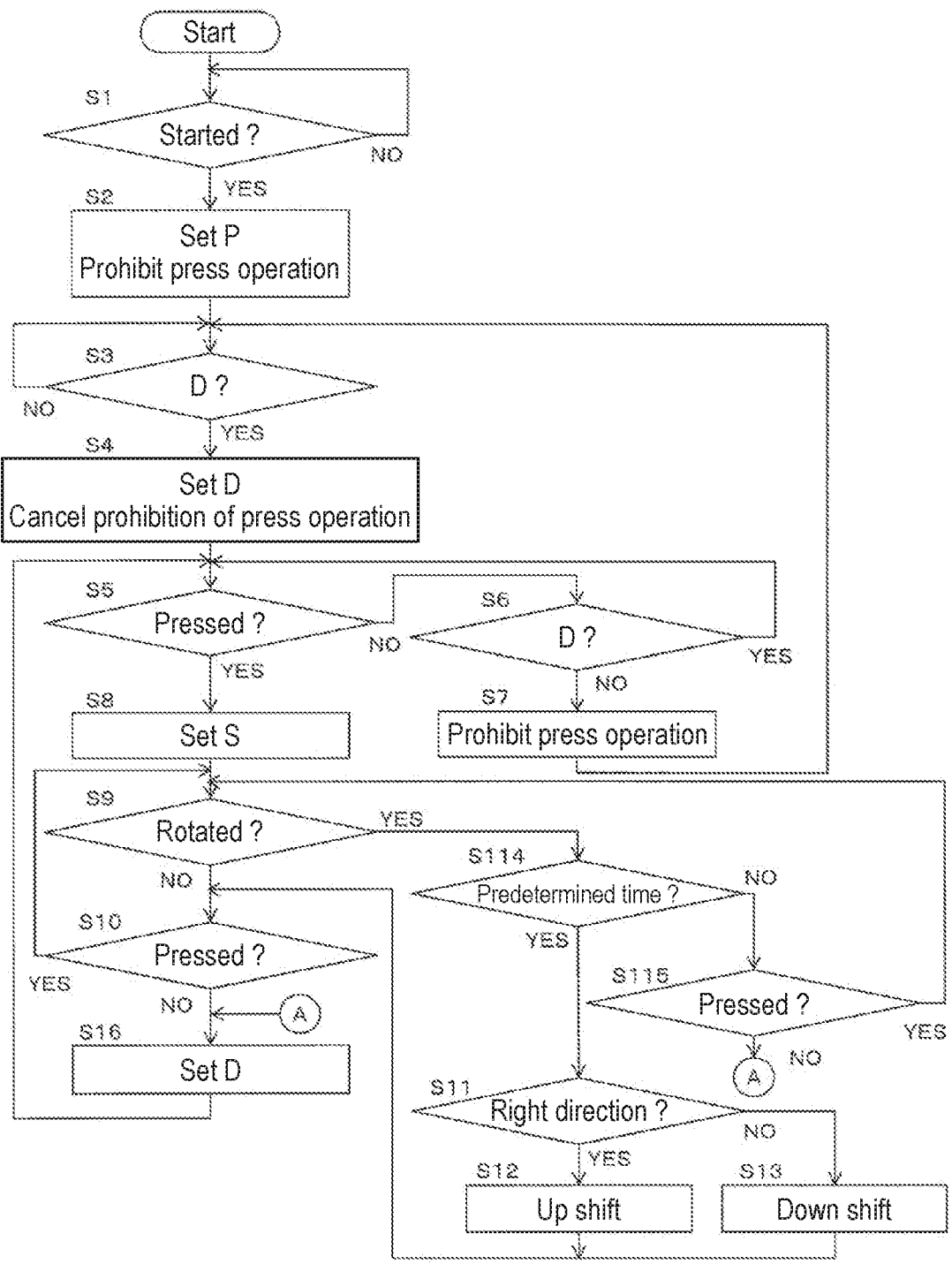
FIG. 7 is a flowchart illustrating an example of an operation method of an input device for a transmission, according to an exemplary modification of the first exemplary embodiment of the present disclosure.

As shown in FIG. 6, in accordance with a number of rotations of knob 20, a gear shift has been performed in range S. Whereas, a gear shift method in range S is not limited to the above described method. For example, as shown in FIG. 7, a gear shift may be performed in range S in accordance with a period of time in which knob 20 is kept maintained (rotation time) at a predetermined rotation angle. In this case, a flow shown in FIG. 7 differs from a flow shown in FIG. 6 in that instead of processing of steps S14 and S15, steps S114 and S115 are processed between step S9 and steps S11, S16. Since processing of steps S1 to S13, and S16 in FIG. 7 are identical to processing of steps S1 to S13, and S16 in FIG. 6, respective descriptions are omitted.

Specifically, after range S is set (step S8), when knob 20 is rotated (step S9: YES), controller 100 measures an elapsed time after knob 20 has been rotated, and then determines whether this elapsed time reaches a predetermined time (step S114). When pressed knob 20 is released before an elapsed time reaches the predetermined time (step S115: NO), controller 100 sets range D (step S16), and processing returns to step S5.

Whereas, when knob 20 is kept pressed and rotated (step S115: YES, S9: YES), controller 100 repeats processing of steps S9, S114, S115 until an elapsed time reaches the predetermined time.

Upon an elapsed time has reached the predetermined time (step S114: YES), and when a rotation direction is a right direction (step S11: YES), an up shift is performed (step S12). On the other hand, when a rotation direction is a left direction (step S11: NO), a down shift is performed (step S13). When an up shift or a down shift is performed (steps S12, S13), controller 100 resets to 0 an elapsed time after knob 20 is rotated, and determines whether knob 20 is pressed and rotated (steps S10, S9). When knob 20 is pressed and rotated (step S10: YES, S9: YES), controller 100 repeats processing of steps S114, S115, S11, S12, S13. A gear level is therefore switched per predetermined time, and an up shift or a down shift is performed.

Second Exemplary Embodiment

In input device 10 for a transmission, according to the first exemplary embodiment, the area of range D and the area of range S have been set in the same rotation area of knob 20. An area of range S in a rotation area of knob 20 is not however limited to the above described setting. For example, in input device 10 for a transmission, according to a second exemplary embodiment, in a rotation area of knob 20, an area of range S is provided next to an area of range D. In terms of this setting, a method for performing a range shift to range S in input device 10 according to the second exemplary embodiment differs from the method for performing a range shift to range S in input device 10 according to the first exemplary embodiment. Since, excluding the above described difference, a configuration, an action, and an effect of input device 10 according to the second exemplary embodiment are identical to a configuration, an action, and an effect of input device 10 according to the first exemplary embodiment, respective descriptions are omitted.

Figure 8:
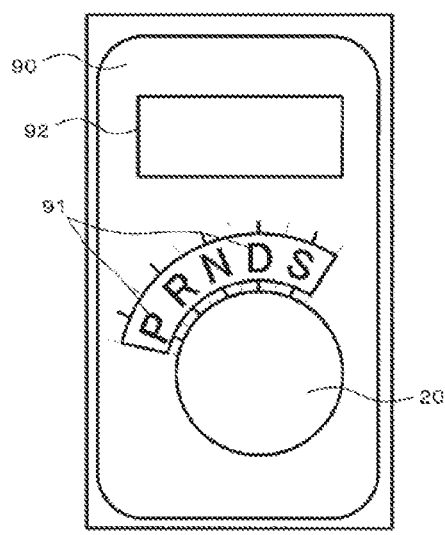
FIG. 8 is a view of an input device for a transmission, according to a second exemplary embodiment of the present disclosure, when viewed from above.

Specifically, as shown in FIG. 8, labels 91 of P, R, N, D, and S are disposed at even intervals in a circumferential direction of knob 20. Accordingly, the rotation area of knob 20 is divided into range areas per predetermined angle ($\alpha$ degrees). In this case, for example, a right direction is referred to as a + direction, while an opposite direction is referred to as a − direction, and a position of knob 20 when the engine is started is referred to as an initial value (0 degrees). Areas of range P, range R, range N, and range D are identical to the areas of range P, range R, range N, and range D in the first exemplary embodiment, but an area of range S is an area from $+7\alpha/2$ degrees to $+9\alpha/2$ degrees. Therefore, a rotation range shift area is an angle area from $-\alpha/2$ degrees to $+9\alpha/2$ degrees, a gear shift area is an angle area from $+7\alpha/2$ degrees to $+9\alpha/2$ degrees, and a standard position of the gear shift area is a center of the gear shift area ($+8\alpha/2$ degrees in this exemplary embodiment).

Figure 10:
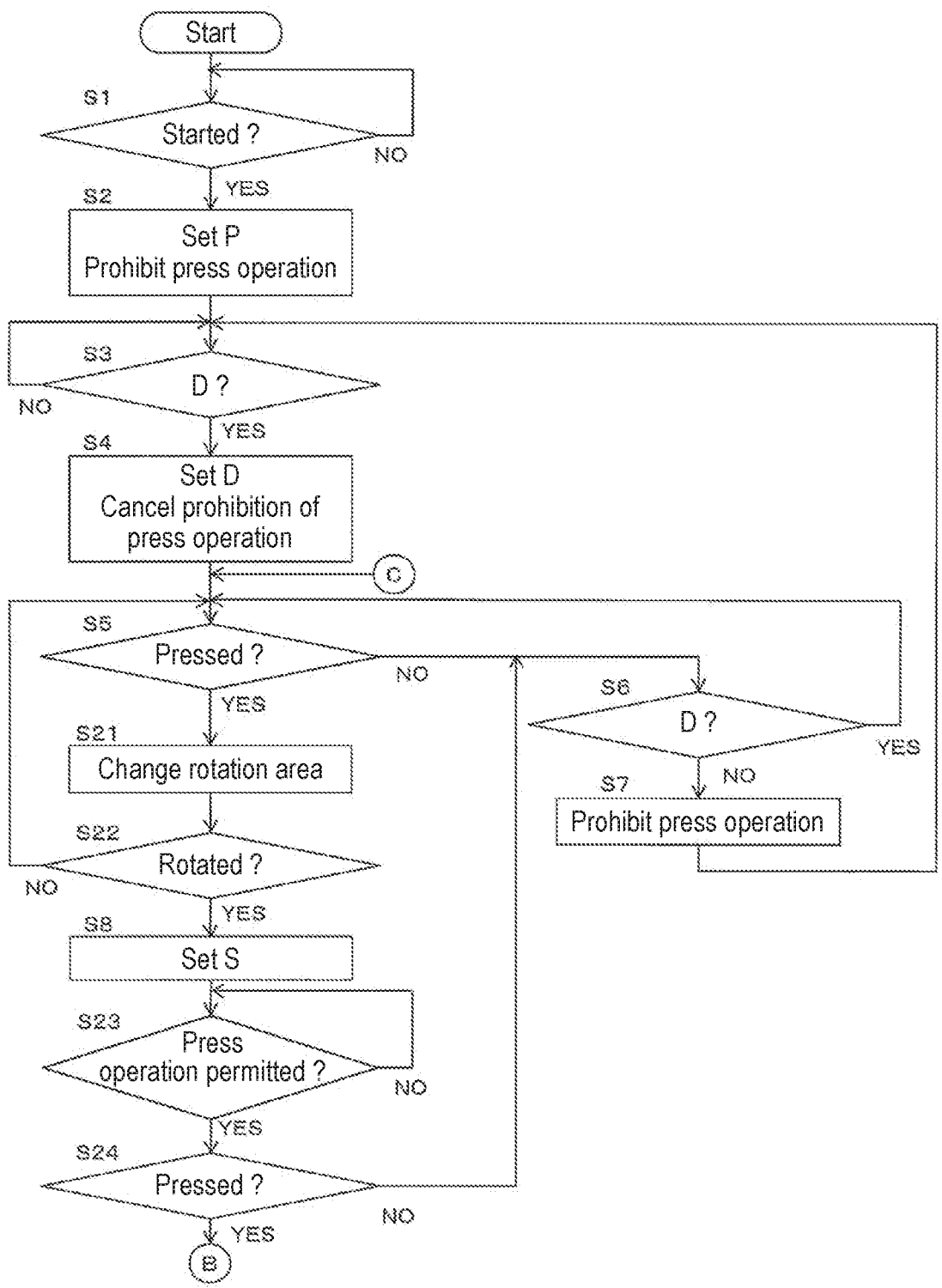
FIG. 10 is a part of a flowchart illustrating an example of the operation method of the input device shown in FIG. 8.
Figure 11:
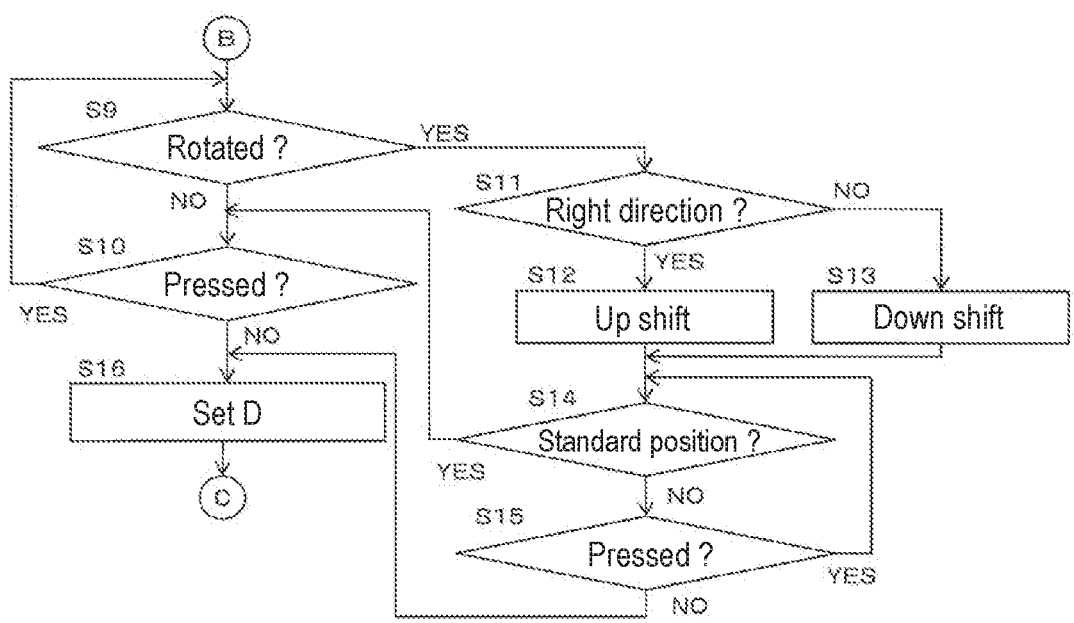
FIG. 11 is a remaining part of the flowchart shown in FIG. 10.

Next, an operation method of input device 10 will now be described herein with reference to FIGS. 9A to 11. The operation method of input device 10 is controlled by controller 100. In FIGS. 9A to 9I, a bar mark indicating a set position of a current range is shown by a dotted line on the upper surface of knob 20 for convenience of description. However, such a mark may not be provided on knob 20. Since processing of steps S1 to S16 in FIGS. 10 and 11 are identical to processing of steps S1 to S16 in FIG. 6, respective detailed descriptions are omitted.

Figure 9A:
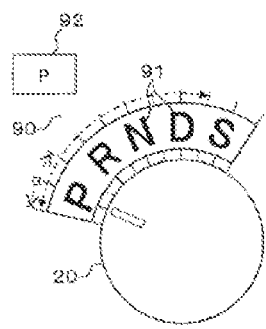
FIGS. 9A to 9I are views for describing an operation method of the input device shown in FIG. 8.

First, as shown in FIG. 9A, when an operator presses the foot brake (not shown) of the vehicle and starts the engine (step S1: YES), controller 100 sets range P, prohibits a press operation to knob 20, and further sets a rotation area of knob 20 to an area from range P to range D (step S2).

Figure 9B:
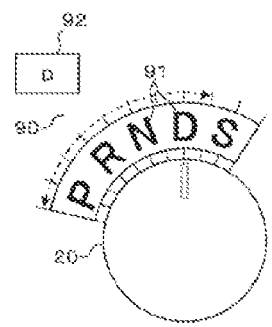
Figure 9C:
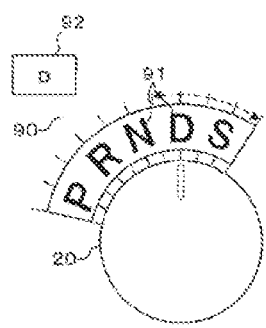

As shown in FIG. 9B, when the operator performs a range shift to range D (step S3: YES), controller 100 sets range D, and cancels the prohibition of a press operation to knob 20 (step S4). As shown in FIG. 9C, when knob 20 is pressed (step S5: YES), controller 100 changes the rotation area of knob 20 to an area from range D to range S (step S21). The operator can therefore perform a range shift in the area from range D to range S.

Figure 9D:
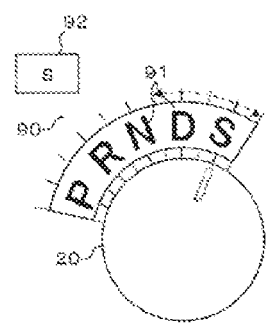

As shown in FIG. 9D, while knob 20 is pressed (step S5: YES), when knob 20 is rotated from an area of range D to an area of range S (step S22: YES), controller 100 sets range S (step S8), and determines whether pressed knob 20 is released (step S23).

Figure 9E:
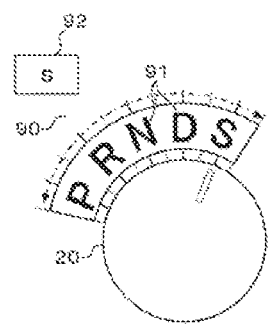

As shown in FIG. 9E, when pressed knob 20 is released, and the press operation to knob 20 is canceled (step S23: YES), controller 100 sets the rotation area of knob 20 to an area from range P to range S. When the operator rotates knob 20 without pressing knob 20, a range shift is performed in accordance with a rotation position of knob 20. When a range shift to another range than range S is performed, but knob 20 is not pressed again (step S24: YES), controller 100 returns to processing of step S6.

Figure 9F:
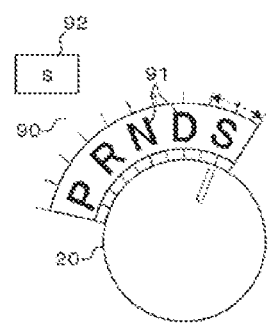

On the other hand, as shown in FIG. 9F, when range S is kept selected, and knob 20 is pressed again (step S24: YES), controller 100 changes the rotation area of knob 20 from a rotation range shift area from range P to range S indicated by arrows shown in FIG. 9E to a gear shift area of range S indicated by arrows shown in FIG. 9F.

Figure 9G:
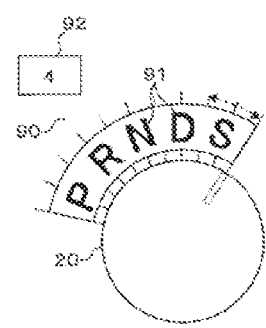
Figure 9H:
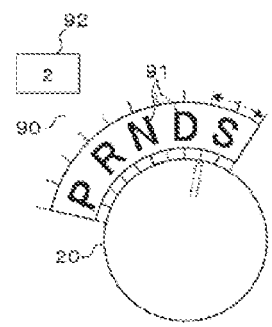

As shown in FIG. 9G, when the operator keeps pressing knob 20, and rotates knob 20 from the standard position to a predetermined angle in a right direction (in this exemplary embodiment, to a position of +9α/2 degrees) (step S9: YES, step S11: YES), for example, an up shift to the fourth gear is performed (step S12). On the other hand, as shown in FIG. 9H, when the operator keeps pressing knob 20, and rotates knob 20 from the standard position to a predetermined angle in a left direction (in this exemplary embodiment, to a position of +7α/2 degrees) (step S9: YES, step S11: NO), for example, a down shift to the second gear is performed (step S13).

Figure 9I:
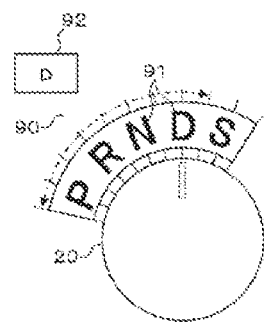

Controller 100 determines whether, after knob 20 is rotated to a predetermined angle, knob 20 has been returned to the standard position of the gear shift area (step S14). When knob 20 is returned to the standard position (step S14: YES), an up shift or a down shift is performed in accordance with a rotation direction and a number of rotations of knob 20 (steps S11, S12, S13). On the other hand, as shown in FIG. 9I, when pressed knob 20 is released (step S10: NO, S15: NO), controller 100 sets range D (step S16), and returns to process of step S5.

Exemplary Modification of Second Exemplary Embodiment

Figure 12:
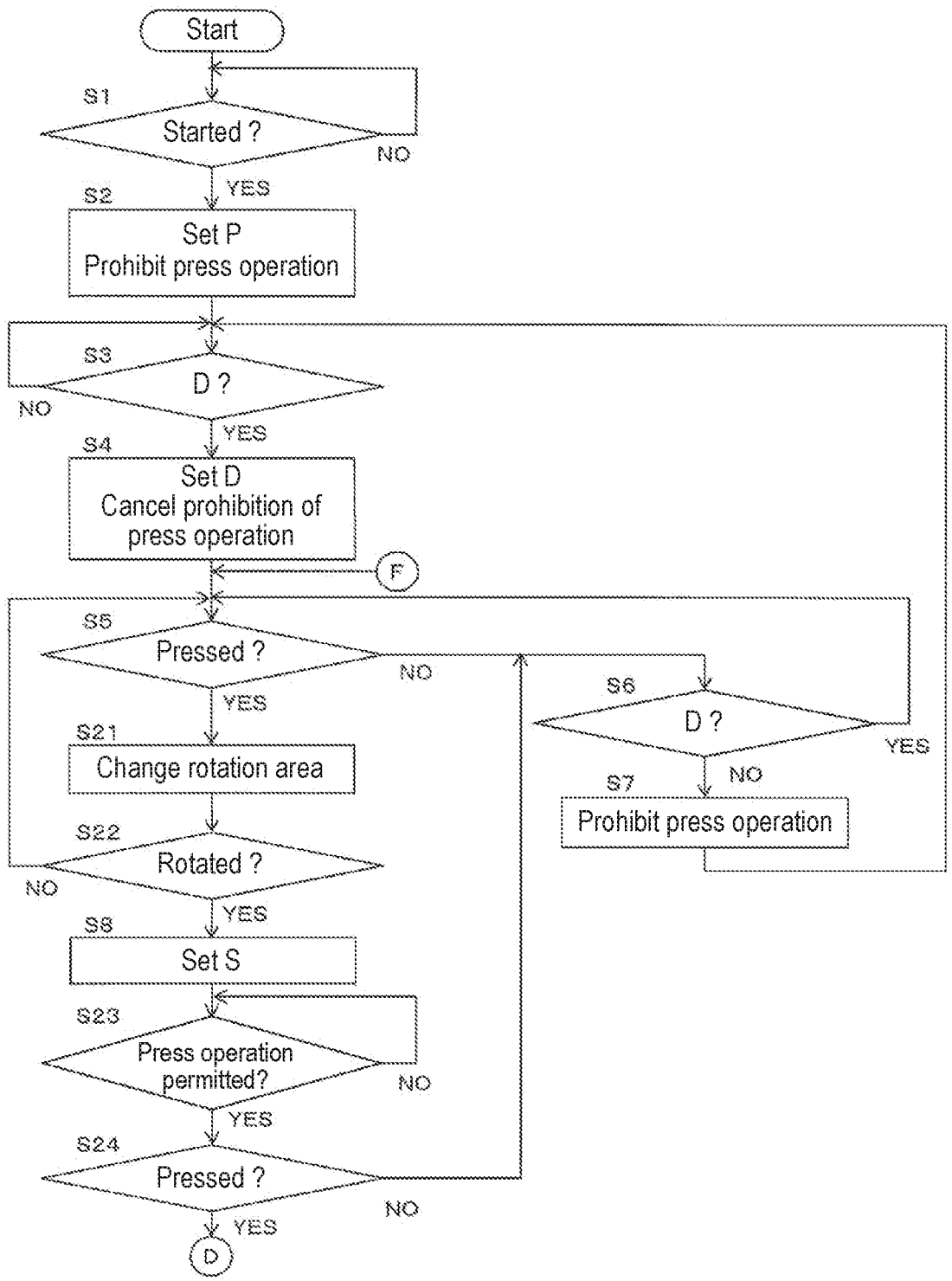
FIG. 12 is a part of a flowchart illustrating an example of an operation method of an input device for a transmission, according to an exemplary modification of the second exemplary embodiment of the present disclosure.
Figure 13:
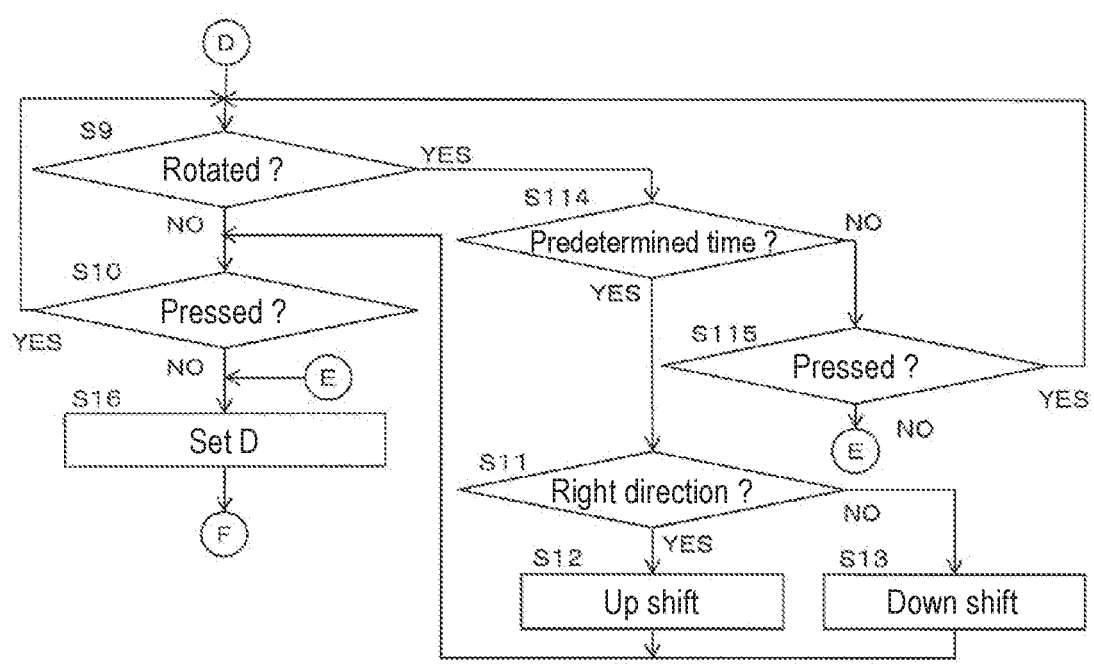
FIG. 13 is a remaining part of the flowchart shown in FIG. 12.

As shown in FIGS. 10 and 11, in accordance with a number of rotations of knob 20, a gear shift has been performed in range S. Whereas, a gear shift method in range S is not limited to the above described method. For example, as shown in FIGS. 12 and 13, in accordance with a rotation time of knob 20, a gear shift may be performed in range S. In this case, a flow shown in FIG. 13 differs from a flow shown in FIG. 11, in that instead of processing of steps S14 and S15, steps S114 and S115 are processed between step S9 and steps S11, S16. Since processing of steps in FIGS. 12 and 13 other than the process described above is identical to processing of steps in FIGS. 10 and 11, respective descriptions are omitted. Since processing of steps S114 and S115 in FIG. 11 are identical to processing of steps S114 and S115 in FIG. 7, respective descriptions are omitted.

Third Exemplary Embodiment

In input device 10 for the transmission, according to the second exemplary embodiment, while knob 20 is set to the area of range D, and when knob 20 is pressed and rotated, a range shift from range D to range S has been performed. A method for performing a range shift to range S is not however limited to the above described method. For example, in input device 10 for a transmission, according to a third exemplary embodiment, while knob 20 is set to an area of range D, when knob 20 is pressed, and then pressed knob 20 is released, and knob 20 is rotated, a range shift from range D to range S is performed. Since, excluding the above described difference, a configuration, an action, and an effect of input device 10 according to the third exemplary embodiment are identical to the configuration, the action, and the effect of input device 10 according to the second exemplary embodiment, respective descriptions are omitted.

Figure 15:
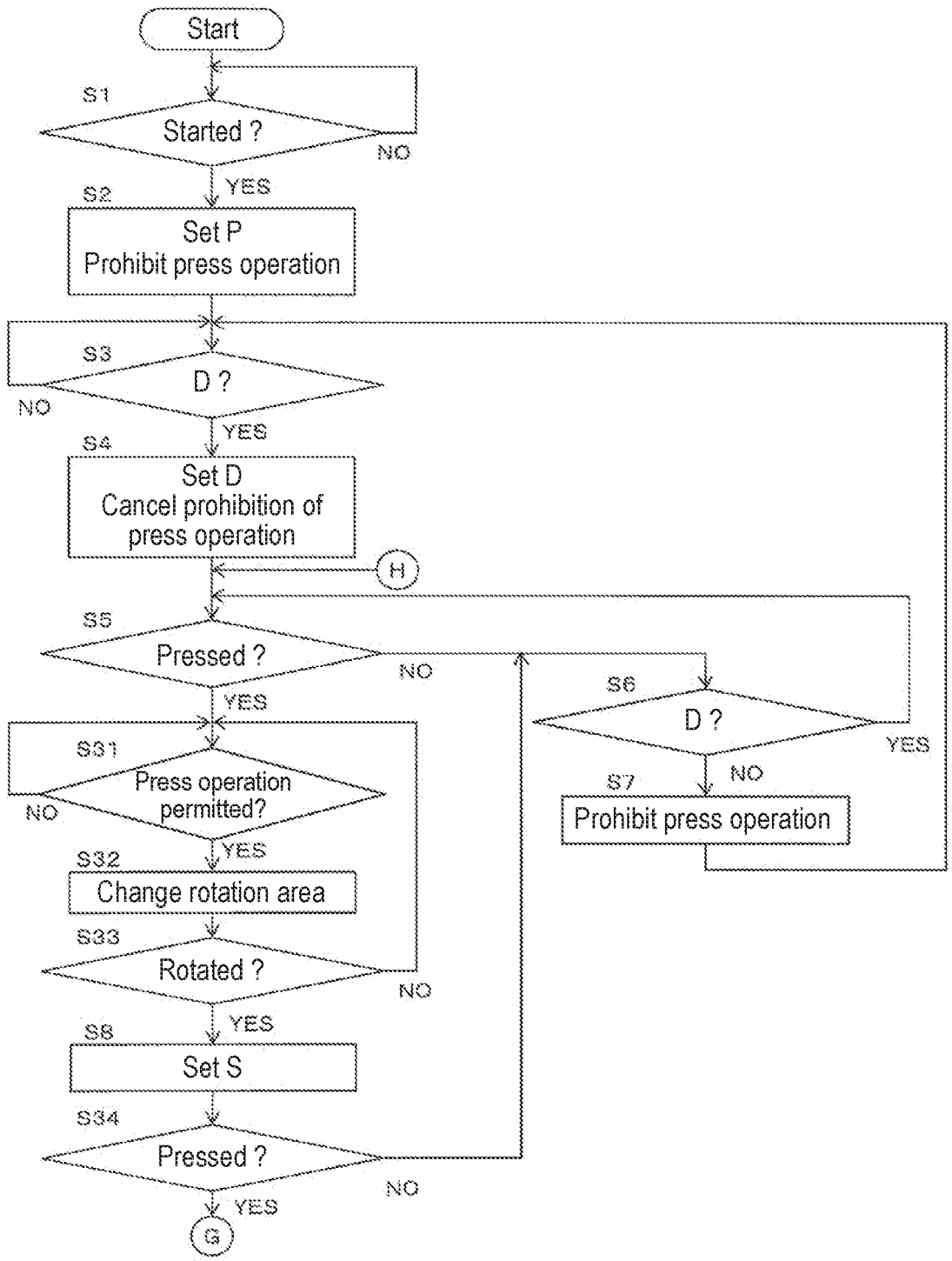
FIG. 15 is a part of a flowchart illustrating an example of an operation method of the input device shown in FIG. 14.
Figure 16:
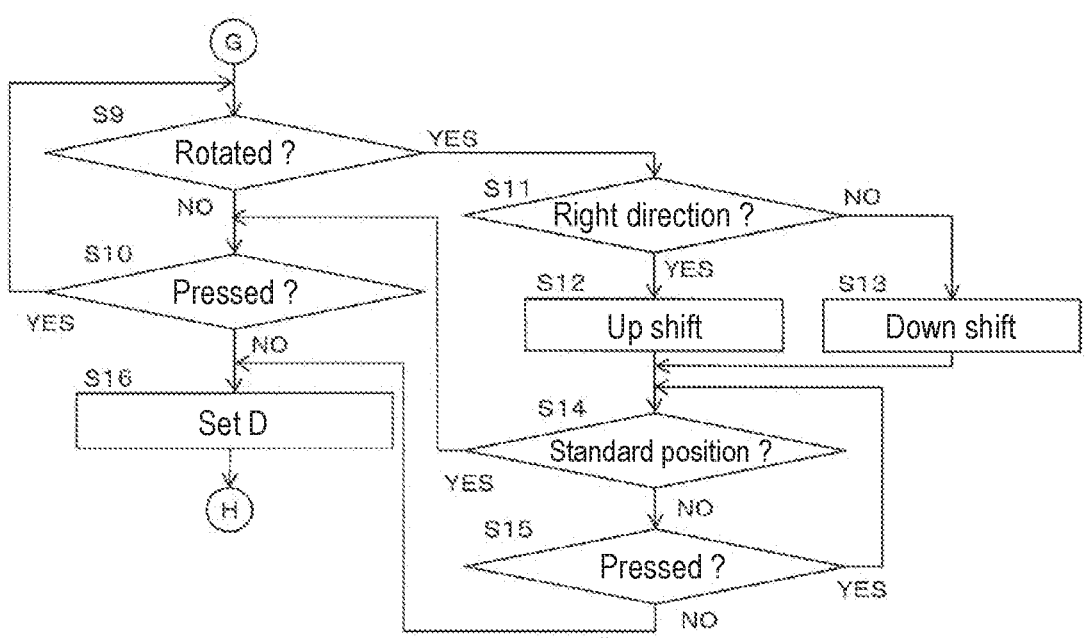
FIG. 16 is a remaining part of the flowchart shown in FIG. 15.

Specifically, an operation method of input device 10 will now be described herein with reference to FIGS. 14A to 16. The operation method of input device 10 is controlled by controller 100. In FIGS. 14A to 14I, a bar mark indicating a set position of a current range is shown by a dotted line on the upper surface of knob 20 for convenience of description. However, such a mark may not be provided on knob 20. Since processing of steps S1 to S16 in FIGS. 15 and 16 are identical to processing of steps S1 to S16 in FIG. 6, respective detailed descriptions are omitted.

Figure 14A:
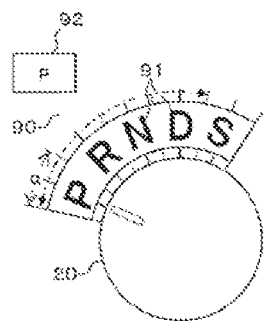
FIGS. 14A to 14I are views for describing an operation method of an input device for a transmission, according to a third exemplary embodiment of the present disclosure.

First, as shown in FIG. 14A, when the engine is started (step S1: YES), controller 100 sets range P, prohibits a press operation to knob 20, and sets a rotation area of knob 20 to an area from range P to range D (step S2).

Figure 14B:
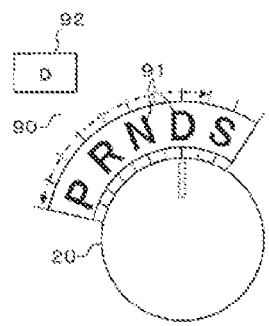
Figure 14C:
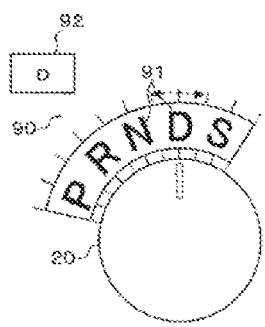

As shown in FIG. 14B, when a range shift to range D is performed (step S3: YES), controller 100 sets range D, and cancels the prohibition of a press operation to knob 20 (step S4). As shown in FIG. 14C, when knob 20 is pressed (step S5: YES), controller 100 limits the rotation area of knob 20 to an area of range D.

Figure 14D:
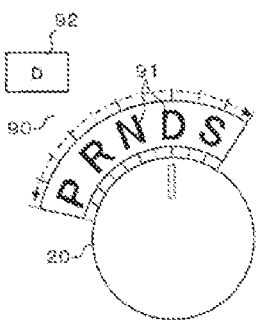

As shown in FIG. 14D, when pressed knob 20 is released (step S31: YES), controller 100 changes the rotation area of knob 20 to an area from range P to range S (step S32). The operator can therefore change the range in the area from range P to range S.

Figure 14E:
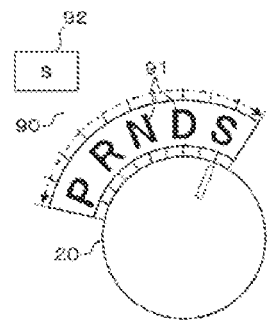
Figure 14F:
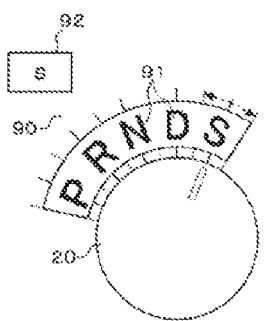

As shown in FIG. 14E, when knob 20 is rotated to an area of range S (step S33: YES), controller 100 sets range S. When knob 20 is pressed again (step S34: YES), controller 100 changes the rotation area of knob 20 from a range shift area from range P to range S indicated by arrows shown in FIG. 14E to a gear shift area of range S indicated by arrows shown in FIG. 14F.

Figure 14G:
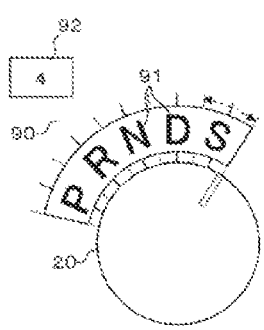
Figure 14H:
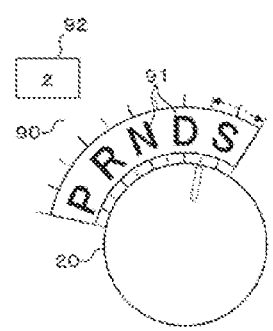

As shown in FIG. 14G, when the operator keeps pressing knob 20, and rotates knob 20 from the standard position to a predetermined angle in a right direction (step S9: YES, step S11: YES), for example, an up shift to the fourth gear is performed (step S12). On the other hand, as shown in FIG. 14H, when the operator keeps pressing knob 20, and rotates knob 20 from the standard position to a predetermined angle in a left direction (step S9: YES, step S11: NO), for example, a down shift to the second gear is performed (step S13).

Figure 14I:
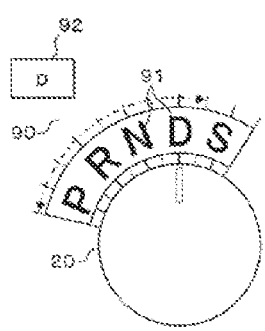

Controller 100 determines whether, after knob 20 is rotated to a predetermined angle, knob 20 has been returned to the standard position of the gear shift area (step S14). When knob 20 is returned to the standard position (step S14: YES), an up shift or a down shift is performed in accordance with a rotation direction and a number of rotations of knob 20 (steps S11, S12, S13). On the other hand, as shown in FIG. 14I, when pressed knob 20 is released (step S10: NO, S15: NO), controller 100 sets range D (step S16), and returns to process of step S5.

Exemplary Modification of Third Exemplary Embodiment

Figure 17:
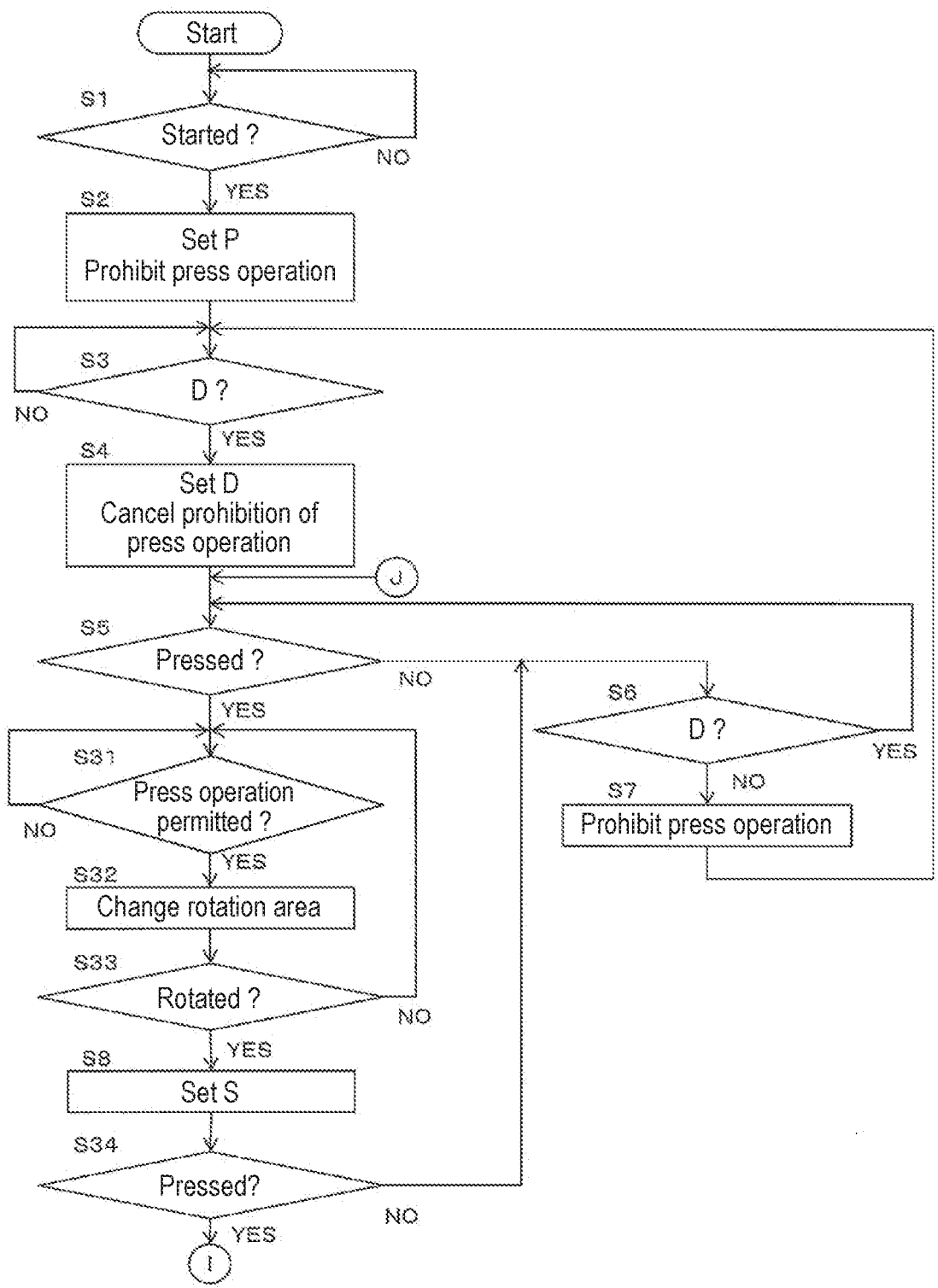
FIG. 17 is a part of a flowchart illustrating an example of an operation method of an input device for a transmission, according to an exemplary modification of the third exemplary embodiment of the present disclosure.
Figure 18:
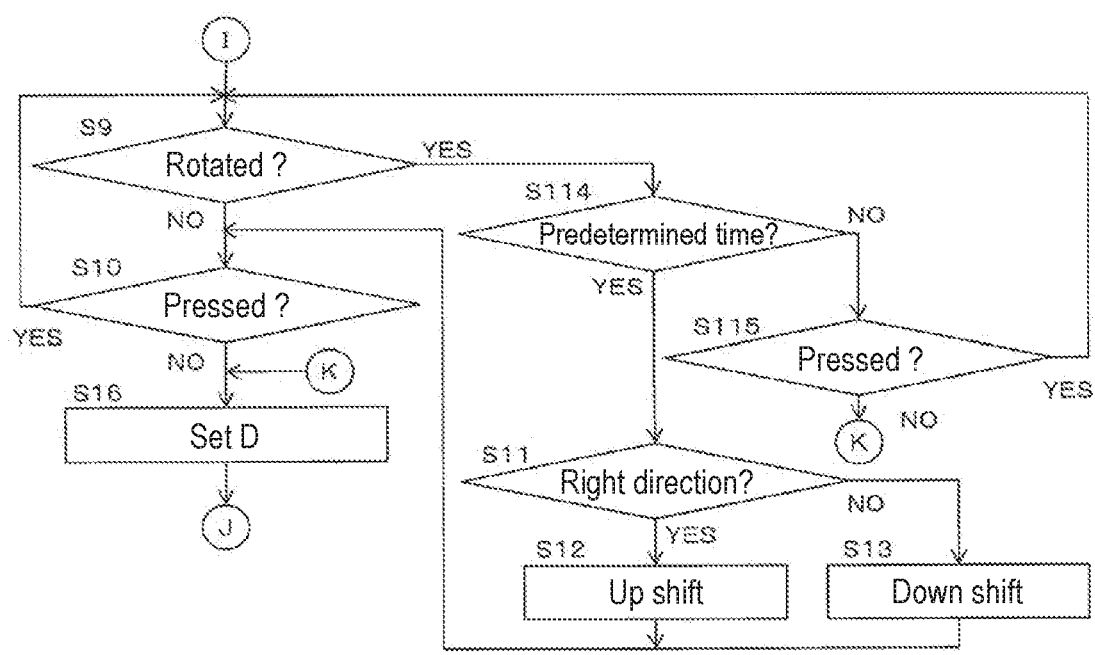
FIG. 18 is a remaining part of the flowchart shown in FIG. 17.

As shown in FIGS. 15 and 16, in accordance with a number of rotations of knob 20, a gear shift is performed in range S. Whereas, a gear shift method in range S is not limited to the above described method. For example, as shown in FIGS. 17 and 18, in accordance with a rotation time of knob 20, a gear shift may be performed in range S. In this case, a flow shown in FIG. 18 differs from a flow shown in FIG. 16, in that instead of processing of steps S14 and S15, steps S114 and S115 are processed between step S9 and step S11. Since processing of steps in FIGS. 17 and 18 other than the process described above is identical to processing of steps in FIGS. 15 and 16, respective descriptions are omitted. Since processing of steps S114 and S115 in FIG. 18 are identical to processing of steps S114 and S115 in FIG. 7, respective descriptions are omitted.

Other Exemplary Embodiments

In the above described first exemplary embodiment, while range D is set, when knob 20 is pressed, a range shift to range S is performed. Whereas, a timing when a range shift to range S is performed is not limited to the above described timing. For example, while range D is set, after knob 20 is pressed, and then pressed knob 20 is released, a range shift to range S may be performed.

In the above described second exemplary embodiment, after knob 20 is pressed, and a range shift to range S is performed, and then pressed knob 20 is released, and again knob 20 is pressed and rotated, a gear shift has been performed. Whereas, a timing when a gear shift is performed is not limited to the above described timing. For example, after knob 20 is pressed, and a range shift to range S is performed, and then knob 20 is kept pressed, and knob 20 is rotated, a gear shift may be performed. In other words, steps S23 and S24 in FIGS. 10, 12 may be omitted.

In all the above described exemplary embodiments, controller 100 may limit, in the second forward travel range, while knob 20 is pressed, a rotation operation to another range. For example, controller 100 may control rotation controller 40 so that a rotation area of knob 20 while knob 20 is pressed is reduced narrower than a rotation area of knob 20 in range S while knob 20 is not pressed, and may perform a gear shift in range S based on a rotation of knob 20.

In other words, in FIGS. 5C to 5E, FIGS. 9F to 9H, and FIGS. 14F to 14H, a gear shift area in range S (±α/2 degrees from a standard position (6α/2 degrees or +8α/2 degrees)) has been set identical to a rotation area of knob 20 in range S within a rotation range shift area (+5α/2 degrees to +7α/2 degrees or +7α/2 degrees to +9α/2 degrees). A gear shift area may however be set narrower than a rotation area of knob 20 in range S.

For example, a gear shift area is a half of a rotation area of knob 20 in range S, and a standard position of the gear shift area is a center of the gear shift area. When a gear shift area is set identical to the rotation area of knob 20 in range S, and an operator has rotated knob 20 for a gear shift, an erroneous operation where a range switches to another range due to an allowance and other factors would therefore be likely to occur. Whereas, when a gear shift area is set narrower than the rotation area of knob 20 in range S, a gap present in the area prevents an erroneous operation even if there is an allowance and other factors.

In all the above described exemplary embodiments, as ranges, range P, range R, range N, range D, and range S have been set. However, range P may not be provided. For example, as ranges, at least range R, range N, range D, and range S may be provided.

In all the above described exemplary embodiments, some exemplary embodiments may be combined each other unless the exemplary embodiments exclude each other. From the above descriptions, for those skilled in the art, it is apparent that the present disclosure can be modified, altered, and improved in various forms, as well as can take other exemplary embodiments. The above descriptions should therefore be construed as examples, and are provided in order to show, to those skilled in the art, the best mode for implementing the present disclosure. Without departing the scope of the present disclosure, its detailed structure and/or function can substantially be altered.

An input device for a transmission, according to the present disclosure, is applicable as an input device for a transmission and other devices with superior operability and with cost reduction.

What is claimed is:

1. An input device for a transmission, comprising:
   a knob for performing rotation and press operations;
   a rotation detector for detecting that the knob is rotated;
   a press detector for detecting that the knob is pressed; and
   a controller for performing, based on results of detection by the rotation detector and the press detector, a range shift between a first forward travel range where a gear shift operation is not accepted and a second forward travel range where the gear shift operation is accepted, and for performing a gear shift in the second forward travel range,
   wherein the controller is configured to, in the first forward travel range, when a predetermined operation is performed with the knob, perform a range shift to the second forward travel range, and, in the second forward travel range, when the knob is rotated with the knob being pressed, perform a gear shift based on the rotation of the knob.

2. The input device for the transmission according to claim 1, wherein the controller is configured to perform a range shift to the second forward travel range, when a condition where at least the knob is pressed in the first forward travel range is satisfied.

3. The input device for the transmission according to claim 2, wherein, in addition to the first forward travel range and the second forward travel range, at least a backward travel range and a neutral range are included, and the controller is configured to, when neither the first forward travel range nor the second forward travel range is selected, prohibit a press operation to the knob, and, when either the first forward travel range or the second forward travel range is selected, cancel the prohibition of a press operation to the knob.

4. The input device for the transmission according to claim 1, wherein the controller is configured to, in the second forward travel range, when the knob is rotated with the knob being pressed, perform a gear shift based on a number of repeated rotation operations of the knob from a standard position to a predetermined rotation angle or a period of time during which the knob is kept maintained at the predetermined rotation angle.

5. The input device for the transmission according to claim 1, wherein, in addition to the first forward travel range and the second forward travel range, at least a backward travel range and a neutral range are included, and the controller is configured to, in the second forward travel range, while the knob is pressed, limit a rotation operation of the knob to another one of the ranges.

6. The input device for the transmission according to claim 5, further comprising a rotation controller for controlling a rotation area of the knob, wherein the controller is configured to, in another range than the second forward travel range, when the knob is rotated with the knob not being pressed, perform a range shift based on the rotation of the knob, and control the rotation controller so that, in the second forward travel range, when the knob is rotated with the knob being pressed, a rotation area of the knob is reduced narrower than a rotation area of the knob in the second forward travel range while the knob is not pressed.

* * * * *